United States Patent
York et al.

(10) Patent No.: US 6,172,441 B1
(45) Date of Patent: Jan. 9, 2001

(54) ROTOR ASSEMBLY

(75) Inventors: Michael Timothy York, Chelsea; Richard Kenneth Harris, Walled Lake, both of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/329,260

(22) Filed: Jun. 28, 1999

(51) Int. Cl.⁷ ....................................... H02K 1/22
(52) U.S. Cl. ..................... 310/263; 310/261; 310/156; 310/218; 310/269
(58) Field of Search ................... 310/263, 261, 310/156, 218, 269

(56) References Cited

U.S. PATENT DOCUMENTS

| | | |
|---|---|---|
| 3,769,696 | 11/1973 | Awano et al. . |
| 3,973,153 | 8/1976 | Berney . |
| 4,850,100 | 7/1989 | Stokes . |
| 4,877,986 | 10/1989 | Shimizu . |
| 5,483,116 | 1/1996 | Kusase et al. . |
| 5,543,676 | 8/1996 | York et al. . |
| 5,747,913 | 5/1998 | Amlee et al. . |
| 5,793,143 | 8/1998 | Harris et al. . |
| 5,831,368 | 11/1998 | Hatsios et al. . |
| 5,903,084 * | 5/1999 | Asao et al. ............................ 310/263 |
| 5,952,755 * | 5/1999 | Lubas ................................... 310/156 |
| 6,023,839 * | 2/2000 | Kinoshita et al. ..................... 29/598 |
| 6,104,118 * | 8/2000 | Kanazawa et al. ................... 310/263 |

* cited by examiner

Primary Examiner—Nestor Ramirez
Assistant Examiner—Thanh Lam
(74) Attorney, Agent, or Firm—Rhonda L. McCoy-Pfau

(57) ABSTRACT

An rotor assembly 10 for use with an electrical machine. Assembly 10 includes two opposing and selectively intermeshing pole pieces 12, 14. Each pole piece 12, 14 has a body 16 and a plurality of integrally formed and outwardly extending projections or pole fingers 18. A plurality of magnets 34 are each fixedly secured, by use of swaged portions 36, within a unique one of several slots 38 which are cooperatively formed between a unique one of fingers 18 and a unique portion of body 16 of pole pieces 12, 14.

3 Claims, 4 Drawing Sheets

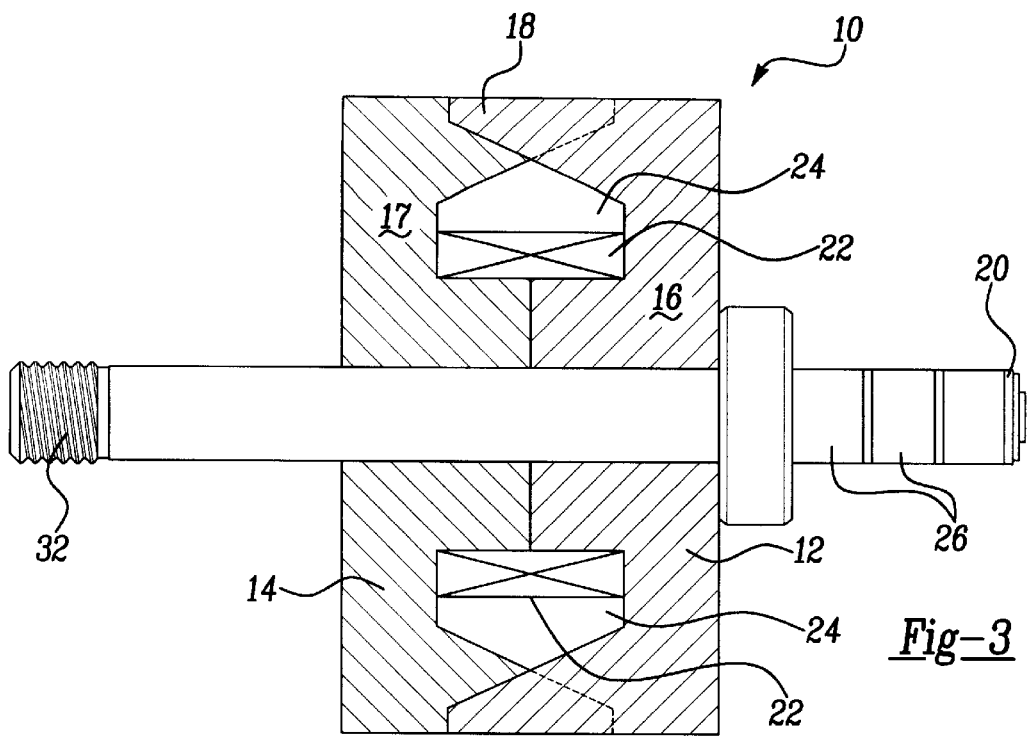
*Fig-3*
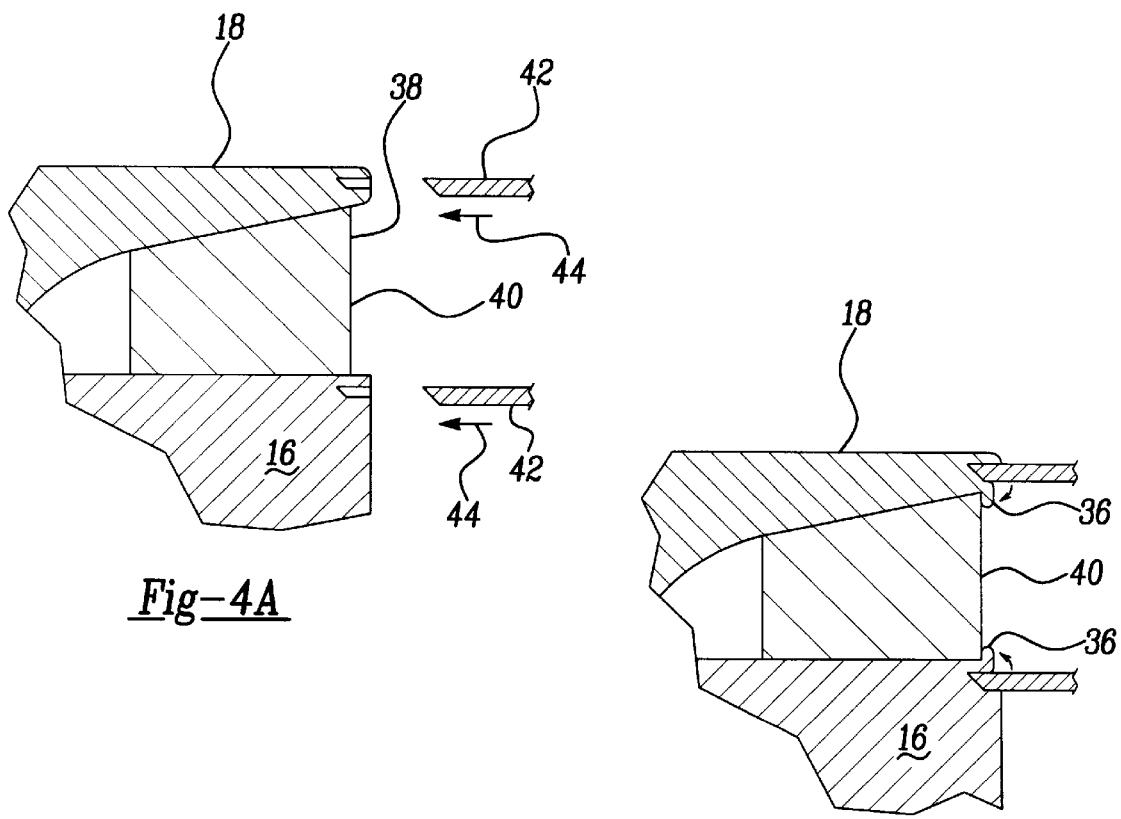
*Fig-4A*  *Fig-4B*

ROTOR ASSEMBLY

FIELD OF THE INVENTION

This invention relates to a rotor assembly for an electrical machine and more particularly, to a rotor assembly for an electrical machine having two opposed pole pieces and several permanent magnets which are selectively secured between the opposed pole pieces by several swaged or tab portions which are integrally formed within the pole pieces.

BACKGROUND OF THE INVENTION

Rotor assemblies are used in electrical machines, such as in automotive vehicle alternators, and include selectively rotatable magnetic pole members which selectively and operably cause electricity to be generated. One common type of alternator, known as a "Lundell" or "claw-pole" type alternator, generally includes a rotor having two opposed "claw-pole" halves or "pole pieces" which are operatively secured to a selectively movable rotor shaft. Each of these pole pieces includes several pole fingers. As the pole pieces are operatively assembled upon the rotor, the respective pole fingers selectively and cooperatively "intermesh", thereby forming a rotor assembly having north and south magnetic poles. In order to increase power density, efficiency, and to reduce rotating inertia, permanent magnets are typically inserted into the rotor assembly and are oftentimes secured between the operatively assembled pole pieces.

One design or method of securing the permanent magnets within the rotor assembly is by "press fitting" a magnet under each of the "tips" or the ends of the pole fingers. One drawback associated with this arrangement is that the magnets will often become loose and/or "fall out" of the assembly due to the centrifugal force generated by the very high rotational speeds of the rotor assembly. Another drawback associated with this arrangement is that the force, stress and/or pressure required to be imparted upon the magnets, as they are press-fitted into their respective operative position within the rotor assembly, causes the relatively brittle magnets to fracture and/or crack. Yet another drawback associated with this prior arrangement is that the magnet surfaces must be formed or created within very "tight" tolerance limits in order to allow the magnets to be relatively smooth, flat and to have particular structural dimensions which allow them to be securely fixed underneath the pole fingers. These "close" tolerances require relatively expensive and time consuming machining processes.

Other prior methods of retaining magnets within the rotor assembly utilize additional components, such as rings, stamped cups and over-molded magnets to "fix" the magnets in the desired positions. These methods increase the overall production cost of the rotor assembly while undesirably increasing the rotor's structural complexity, thereby increasing the probability of component failure. Furthermore, the use of these additional "magnet securing components" creates undesirable gaps between the pole pieces and the magnets, thereby decreasing the electrical output and efficiency of the assembly. Finally, these prior methods do not substantially allow for direct and desirable contact between the respective magnet surfaces and the rotor pole pieces and prevents and/or reduces the amount by which the magnets may be cooled during operation of the rotor assembly.

There is therefore a need to provide a rotor assembly which overcomes the various and previously delineated drawbacks of the various prior assemblies; which includes several selectively and fixedly secured permanent magnets; which does not require a relatively high amount of force, stress or pressure to be imparted upon the permanent magnets as they are secured within the rotor assembly; which does not require the magnets to undergo expensive machining processes; and which does not require additional "magnet securing components" to be included within the rotor assembly.

SUMMARY OF THE INVENTION

It is a first object of the present invention to provide a rotor assembly which overcomes some or all of the previously delineated drawbacks of prior rotor assemblies and which includes at least one selectively and fixedly secured permanent magnet.

It is a second object of the invention to provide a rotor assembly for use with an electrical machine which requires a relatively small amount of force, stress or pressure to be imparted upon the permanent magnets during the rotor assembly process.

It is a third object of the present invention to provide a rotor assembly which obviates the need for relatively expensive magnet machining and which does not substantially increase the overall structural complexity of the rotor assembly.

According to a first aspect of the present invention, a rotor assembly is provided. The rotor assembly includes a first pole piece including a body having several integrally formed pole fingers extending axially from the body, and a second pole piece including a body having several integrally formed pole fingers extending axially from the body. The rotor assembly further includes at least one magnet which is fixedly secured between a unique one of the several pole fingers of the first pole piece and the body of the second pole piece. The unique one of the several pole fingers of the first pole piece has at least one swaged portion which is effective to fixedly secure the at least one magnet between the unique one of the several pole fingers of the first pole piece and the body of the second pole piece.

According to a second aspect of the present invention a method for fixedly securing a magnet within a rotor assembly is provided. The method includes the steps of positioning the magnet between a first and a second surface of the rotor assembly; providing a pointed tool; inserting the pointed tool into at least one of the two surfaces, thereby creating at least one swaged portion in the at least one of the two surfaces, the created swaged portion being effective to fixedly secure the magnet within the rotor assembly.

These and other objects, aspects, features, and advantages of the present invention will become apparent from a consideration of the following specification and the attached drawings.

BRIEF DESCRIPTION OF THE DRAWINGS

FIG. 3 is a side cross sectional view of the rotor assembly shown in FIG. 1;

FIG. 4A is a fragmented cross sectional view of the rotor assembly which is shown in FIG. 1 and taken along view line "4A—4A", and further illustrating a tool made in accordance with the preferred embodiment of the invention.

FIG. 4B is a fragmented cross sectional view of rotor assembly shown in FIGS. 1 and 4A, taken along view line "4B—4B", and illustrating the selective formation of several swaged portions by the use of the tool which is shown in FIG. 4A;

DETAILED DESCRIPTION OF THE PREFERRED EMBODIMENT OF THE INVENTION

Figure 1:
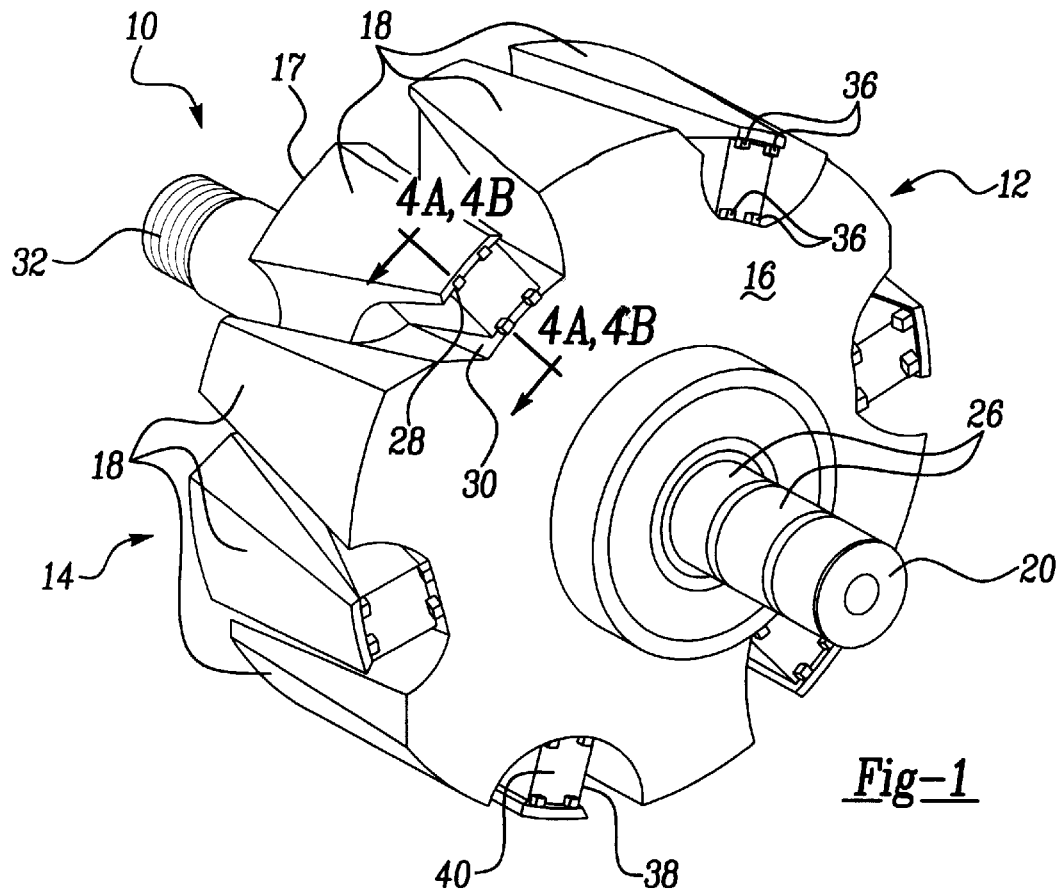
FIG. 1 is a perspective view of a rotor assembly which is made in accordance with the teachings of the preferred embodiment of the invention.

Referring now to FIGS. 1–4, there is shown a rotor assembly 10 which is made in accordance with the teachings of the preferred embodiment of the invention and which is adapted for use within an electrical machine. As shown, rotor assembly 10 includes two substantially and similarly shaped opposed "pole pieces" or pole members 12, 14. Each pole member 12, 14 has a respective and generally circular shaped body 16, 17 having integrally formed and substantially similar, magnetic projections or pole fingers 18 which outwardly and axially extend from each respective body 16, 17. Fingers 18 are generally parallel to the longitudinal axis of symmetry of the assembly 10 when pole pieces 12, 14 are operatively assembled, as shown within FIG. 1.

Pole pieces 12, 14 are manufactured, in one non-limiting embodiment, from a relatively soft metallic material, such as a conventional and commercially available annealed iron or alloy. Pole pieces 12, 14 are coupled to a rotor shaft 20 in a conventional manner and are operatively and selectively positioned so that the respective pole fingers 18 of pole pieces 12, 14 are cooperatively and selectively intermeshed to form several substantially identical magnet reception slots 38 which are generally and circumferentially positioned around the assembly 10. Particularly, each of the slots 38 is formed by the bottom surface 28 of a unique one of the fingers 18 and a surface 30 of body 16 or 17, opposite of surface 28. Shaft 20 has a threaded end 32 which allows for rotor assembly 10 to be coupled to a pulley or drive belt for selectively driving or rotating rotor assembly 10 within an alternator or other machine/device/assembly. A coil 22 is typically mounted within a channel 24 which is integrally and cooperatively formed by the selective union or assembly of pole pieces 12, 14. Coil 22 is further and typically electrically and physically connected to slip rings 26 which allow electrical power to be selectively coupled to the contained coil 22. Based upon the foregoing, it should be apparent that rotor assembly 10 comprises a Lundell or "claw-pole" rotor having novel magnet placement/positioning features which are more fully delineated below.

Rotor assembly 10 further includes a plurality of substantially identical magnets or magnetic inserts 34, preferably made from permanent or substantially permanent magnet material. In one non-limiting embodiment, magnetic inserts 34 may comprise magnetic material encased within a durable shell, such as a stainless steel shell. However, in the most preferred embodiment of the invention, no such shell or casing is employed.

Particularly, each magnet 34 is shaped to fit within and to insertably and fixably conform to a unique one of the slots 38. In one embodiment, magnets 34 rather loosely fit within the slots 38 and are not required to be formed to the "tight" or close tolerance limits required by prior assemblies. Substantially identical swaged or tab portions 36 are integrally formed within assembly 10 and are effective to securely fix the magnets 34 within the assembly. In one non-limiting embodiment, a pair of swaged portions or projecting tabs 36 are formed within each finger 18 and within each portion of the respective surface 30 forming a slot 38, effective to cause each magnet 34 to be retained within assembly 10 by four such swaged portions 36.

Figure 2:
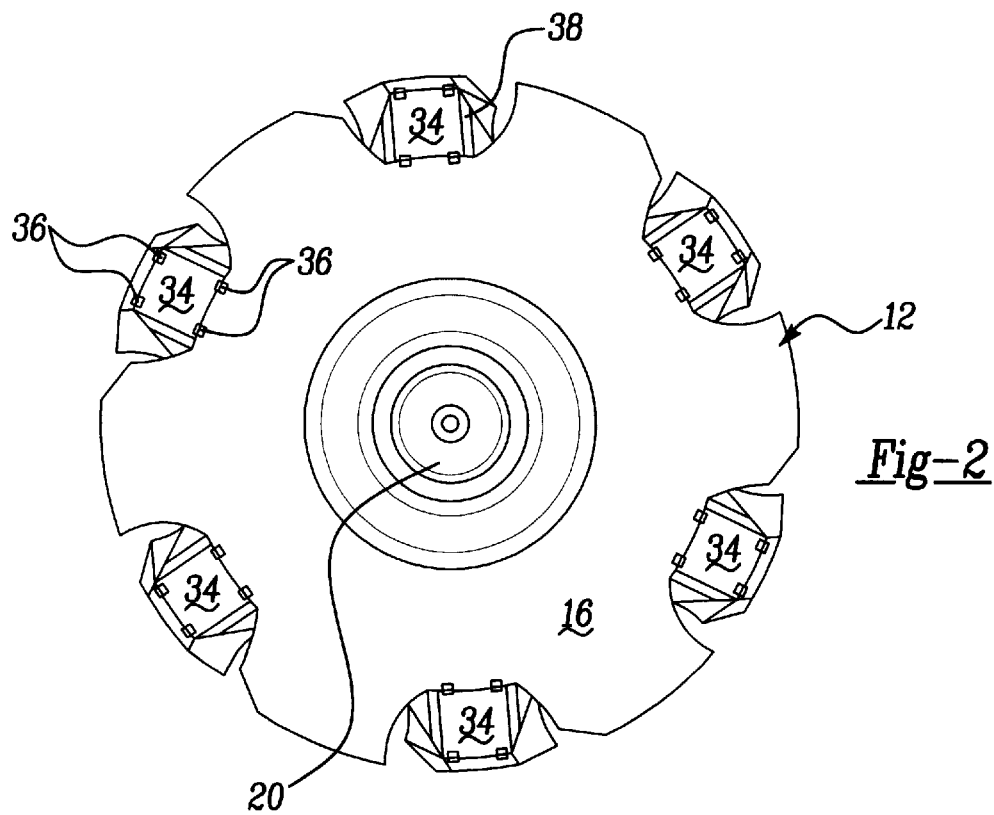
FIG. 2 is a top view of the rotor assembly shown in FIG. 1.

During the assembly of rotor 10, pole pieces 12 and 14 and coil 22 are selectively mounted upon shaft 20 in a conventional manner and in the respective positions illustrated in FIGS. 1–3. Magnets 34 are then inserted into slots 38 which frictionally or "loosely" receive magnets 34, thereby holding magnets 34 in their respective positions illustrated in FIGS. 1 and 2.

Once the magnets 34 are fully inserted within their respective slots 38, a relatively sharply pointed hardened steel swage or tool 42 is selectively forced or "driven" into each of the pole fingers 18 and the body 16, 17, in the direction indicated by arrow 44 and in relative close proximity to each magnet 34 and, more specifically, in relative close proximity to the four opposing and respective corners of outer surface 40 of each magnet 34. As illustrated best in FIG. 4B, the insertion of tool 42 into each pole finger 18 and body 16, 17 causes the metal in the immediate proximity of the tip 46 of tool 42 to swage or bend, thereby creating or forming swaged or tab portions 36. Swaged portions 36 pressingly abut the outer surface 40 of the contained magnets 34, thereby cooperatively and fixedly securing magnets 34 in their respective positions and substantially preventing the magnets 34 from sliding or otherwise moving within or outside of slots 38. It should be understood that alternative or additional swaged portions may be created or formed in relative proximity to the outer periphery of magnets 34 in a substantially identical manner to further fixedly secure magnets 34 within their respective positions within slots 38. It should be further understood that these swaged portions 36 allow the magnets 34 to be selectively and securely maintained within the assembly 10 in a relatively cost-efficient manner without the need for additional "magnet securing" componetry which increases the overall cost and structure/complexity of the assembly 10. Further, it should be realized that swaged portions 36 allow "wider" tolerance limits since the magnets 34 are retained within the assembly 10 by the swaged portions 36 and do not need to be frictionally secured within the slots 38.

Figure 5:
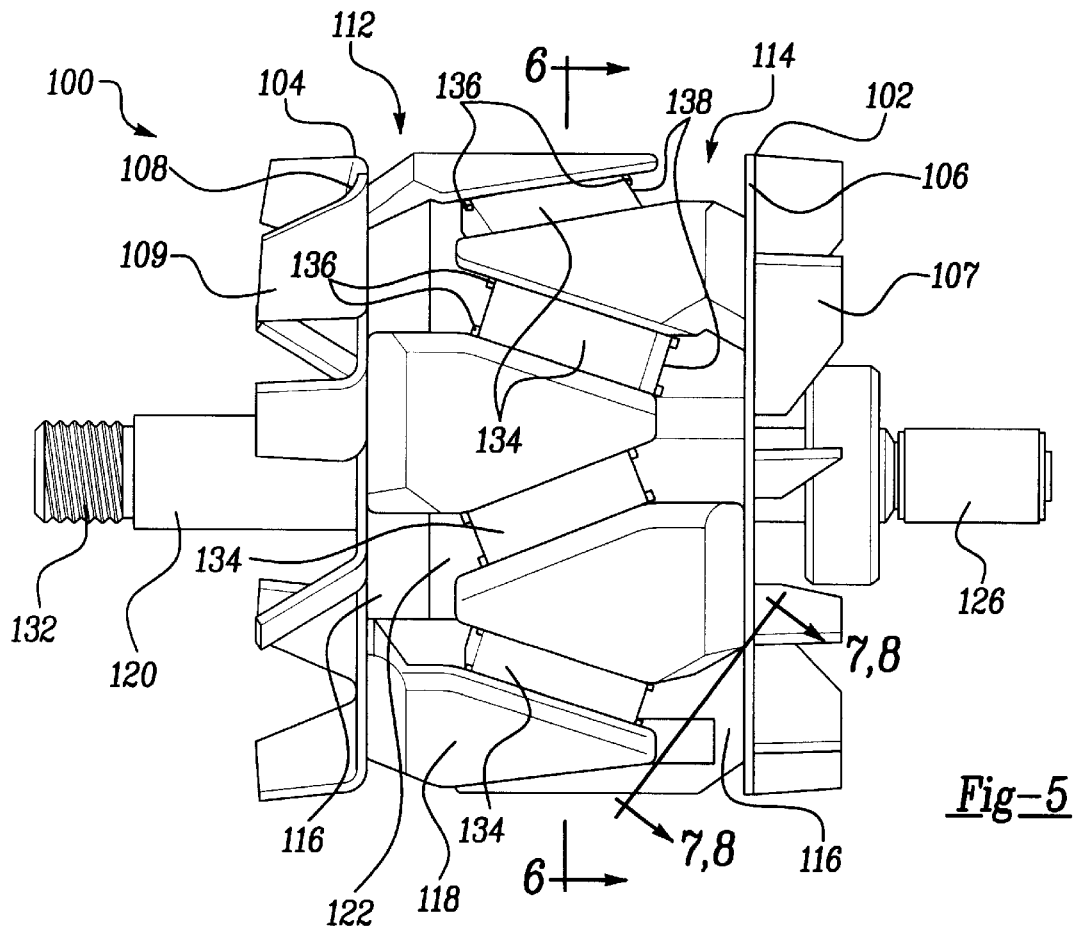
FIG. 5 is a perspective view of a rotor assembly which is made in accordance with the teachings of a second embodiment of the invention.
Figure 6:
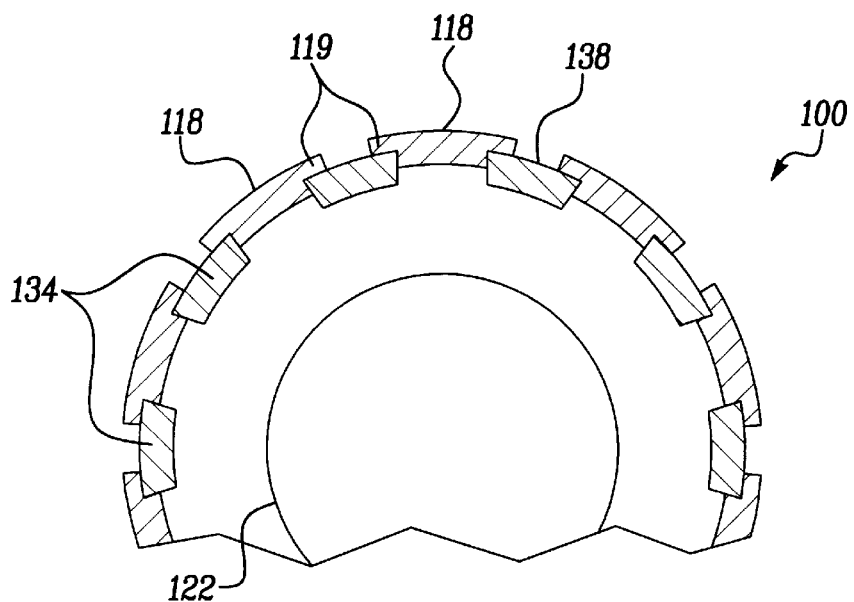
FIG. 6 is a fragmented cross sectional view of the rotor assembly which is shown in FIG. 5 and which is taken along view line "6—6"

A rotor assembly 100 which is made in accordance with the principles of a second embodiment of the present invention is illustrated in FIG. 5. Particularly, rotor assembly 100 includes two substantially similarly shaped opposing pole pieces 112, 114 each having a respective body 116 and integrally formed, substantially triangular shaped, magnetic projections or pole fingers 118 which axially and outwardly extend from each body 116 and which selectively and operatively intermesh. As best illustrated in FIG. 6, each pole finger 118 includes two opposed and integrally formed ridges 119. Fingers 118 therefore cooperatively form a plurality of channels 138. Particularly, channels 138 are formed between each intermeshed pair of pole fingers 118.

Pole pieces 112, 114 are preferably manufactured from a relatively soft metal material, such as an annealed iron or alloy. Pole pieces 112, 114 are coupled to a rotor shaft 120 in a conventional manner and are operatively positioned so that the pole fingers 118 of pole pieces 112, 114 are selectively and respectively intermeshed as the pieces 112, 114 are positioned upon shaft 120. Shaft 120 has a threaded end 132 which allows for rotor assembly 100 to be coupled to a pulley or drive belt for driving or rotating rotor assembly 100 within an alternator. Rotor assembly 100 further includes fans 102, 104 which may be integrally formed with and/or secured to the respective body 116 of each pole piece 112 and 114. Each fan 102, 104 respectively includes a body portion 106, 108 and several fan blades 107, 109. Particularly, blades 107, 109 extend outwardly from the respective body portion 106, 108. A coil 122 is mounted between pole pieces 112, 114 and is electrically and physically connected to slip ring 126 which allows electrical power to be communicated to the coil 122.

Rotor assembly 100 further includes several substantially identical magnets 134, preferably made from permanent magnet material. Each magnet 134 is shaped to fit snugly and conformably within a unique one of channels 138 formed by the pair of opposed pole fingers 118. Four selectively formed and/or created swaged portions 136, preferably located in relative proximity to the opposing four corners of each of the magnets 134, securely holds the magnets 134 within the respective channels 138.

Rotor assembly 100 is assembled by mounting pole pieces 112, 114 and coil 122 upon shaft 120 in a conventional manner and in the respective positions illustrated in FIGS. 5 and 6. Magnets 134 are then frictionally and fixably inserted into channels 138 and reside within respective positions illustrated in FIGS. 5 and 6. Swaged portions or tabs 136 are then formed to hold these magnets 134 within the positions shown.

Figure 7:
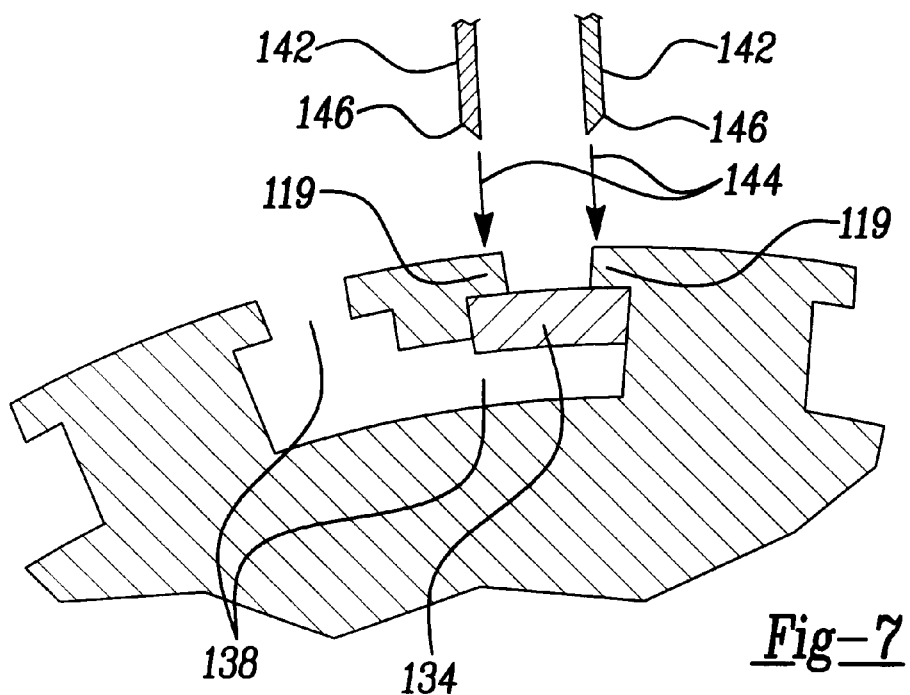
FIG. 7 is a fragmented cross sectional view of the rotor assembly which is shown in FIG. 5 and which is taken along view line "7—7"
Figure 8:
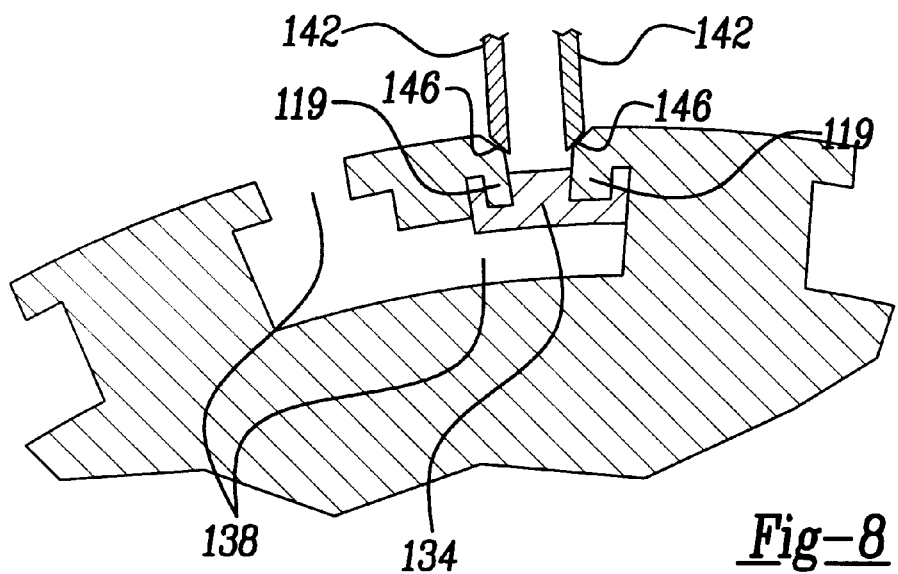
FIG. 8 is a fragmented cross sectional view of rotor assembly shown in FIG. 5 which is taken along view line "8—8" and illustrating the selective formation of several swaged portions by the use of the tool which is shown in FIGS. 4A and 4B.

Referring now to FIGS. 7 and 8, there is illustrated a method of creating or forming swaged portions 136, which fixedly secure magnets 134 in their respective positions. That is, once a magnet 134 is fully inserted within one of channels 138, a sharply pointed swage creation tool 142, substantially similar to tool 42, is selectively forced or "driven" into the ridge portions 119 of each opposed pole fingers 118 which cooperatively form the channel 138. Tool 142 is driven into ridge portions 119 in the direction indicated by arrows 144 in relative proximity to magnet 134 and more specifically in relative proximity to the four opposing corners of the magnet 134.

As illustrated best in FIG. 8, the insertion of tool 142 into opposed ridge portions 119 causes the metal, in immediate proximity of the tip 146 of tool 142, to swage or bend, thereby creating or forming swaged portions 136. Swaged portions 136 pressingly abut the retained magnets 134, thereby fixedly securing the magnets 134 in their respective positions and preventing the magnets 134 from sliding or otherwise moving within or outside of channels 138. It should be understood that alternative or additional swaged portions may also be created or formed within pole fingers 118 and/or ridge portions 119 in a substantially identical manner.

It is understood that the invention is not limited by the exact construction or method illustrated and described above but that various changes and/or modifications may be made without departing from the spirit and/or the scope of Applicants' inventions.

What is claimed is:

1. A rotor assembly for use in an electrical machine, said rotor assembly comprising:

a first pole piece having a body and a plurality of pole fingers extending from said body;

a second pole piece having a body and a plurality of pole fingers extending from said body;

at least one magnet which is fixedly secured in a position located between a unique one of said plurality of pole fingers of said first pole piece and said body of said second pole piece, said unique one of said plurality of pole fingers having at least one swaged portion which is effective to fixedly secure said at least one magnet within said position.

2. The rotor assembly of claim 1 further including a second magnet which is fixedly secured between a unique one of said plurality of pole fingers of said second pole piece and said body of said first pole piece.

3. A rotor assembly for use in an electrical machine, said rotor assembly comprising:

a first pole piece having a body and a plurality of pole fingers axially extending from said body;

a second pole piece having a body and a plurality of pole fingers axially extending from said body; and at least one magnet which is fixedly secured in said rotor assembly in a position located between a unique one of said plurality of pole fingers of said first pole piece and a unique one of said plurality of pole fingers of said second pole piece, said unique one of said plurality of pole fingers of said first pole piece having a swaged portion which engages said at least one magnet and which is effective to fixedly secure said at least one magnet in said position within said rotor assembly.

* * * * *